US010625744B2

(12) United States Patent
Jung

(10) Patent No.: US 10,625,744 B2
(45) Date of Patent: Apr. 21, 2020

(54) CONTROL SYSTEM OF DRIVE WHEEL OF VEHICLE AND CONTROL METHOD OF DRIVE WHEEL OF VEHICLE USING THE SAME

(71) Applicants: Hyundai Motor Company, Seoul (KR); Kia Motors Corporation, Seoul (KR)

(72) Inventor: Jang Hyun Jung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 60 days.

(21) Appl. No.: 15/974,127

(22) Filed: May 8, 2018

(65) Prior Publication Data

US 2019/0168763 A1 Jun. 6, 2019

(30) Foreign Application Priority Data

Dec. 5, 2017 (KR) .................. 10-2017-0166116

(51) Int. Cl.
*B60W 30/18* (2012.01)
*B60W 10/20* (2006.01)
*B60W 40/12* (2012.01)

(52) U.S. Cl.
CPC ...... *B60W 30/18181* (2013.01); *B60W 10/20* (2013.01); *B60W 40/12* (2013.01);
(Continued)

(58) Field of Classification Search
CPC .......... B60W 30/18181; B60W 40/12; B60W 10/20; B60W 2720/28; B60W 2720/24; B60W 2520/28; B60W 2520/26–266
See application file for complete search history.

(56) References Cited

U.S. PATENT DOCUMENTS

| 4,989,923 A * | 2/1991 | Lee ........................ B60T 8/172 |
| | | 188/181 C |
| 6,089,681 A * | 7/2000 | Watanabe ................. B60T 8/32 |
| | | 303/158 |

(Continued)

FOREIGN PATENT DOCUMENTS

| JP | 3684757 B2 | 8/2005 |
| JP | 2015-148495 A | 8/2015 |

(Continued)

*Primary Examiner* — Jess Whittington
*Assistant Examiner* — Brian E Yang
(74) *Attorney, Agent, or Firm* — Mintz Levin Cohn Ferris Glovsky and Popeo, P.C.; Peter F. Corless

(57) ABSTRACT

A control system of a wheel of a vehicle includes: a wheel speed sensor configured to measure a wheel speed of wheels of the vehicle; a data storage configured to store data relating to a plurality of abnormal patterns based on a slip state or a lock state of each wheel; and a controller configured to extract wheel speed pattern data using wheel speeds measured from the wheel speed sensor, to compare the extracted wheel speed pattern data with the stored data relating to the plurality of abnormal patterns, to determine an abnormal pattern among the plurality of abnormal patterns most similar to the extracted wheel speed pattern data according to the comparison, and to detect an abnormal wheel among the wheels of the vehicle based on the determined abnormal pattern.

18 Claims, 6 Drawing Sheets

(52) U.S. Cl.
CPC ..... *B60W 2520/28* (2013.01); *B60W 2720/24* (2013.01); *B60W 2720/28* (2013.01)

(56) References Cited

U.S. PATENT DOCUMENTS

| | | | |
|---|---|---|---|
| 2004/0133400 A1* | 7/2004 | Polzin | B60C 23/061 702/188 |
| 2006/0017554 A1* | 1/2006 | Stewart | B60C 23/0416 340/447 |
| 2006/0208169 A1* | 9/2006 | Breed | B60N 2/002 250/221 |
| 2006/0272875 A1* | 12/2006 | Matsuda | B62J 27/00 180/197 |
| 2007/0205879 A1* | 9/2007 | Matsuda | B60T 8/173 340/438 |
| 2008/0209995 A1* | 9/2008 | Taylor | G01L 17/005 73/146 |
| 2010/0121544 A1* | 5/2010 | Kodama | B60K 17/35 701/58 |
| 2012/0185122 A1* | 7/2012 | Sullivan | G05D 1/0272 701/23 |
| 2012/0219207 A1* | 8/2012 | Shin | B25J 9/162 382/153 |
| 2013/0245910 A1* | 9/2013 | Watanabe | B60T 7/042 701/79 |
| 2014/0229072 A1* | 8/2014 | Kang | B62D 7/159 701/42 |
| 2014/0379220 A1* | 12/2014 | Lee | B60W 30/18172 701/42 |
| 2015/0166072 A1* | 6/2015 | Powers | B60W 40/076 701/1 |
| 2015/0298513 A1* | 10/2015 | Taki | B60C 23/061 73/146.2 |
| 2017/0043787 A1* | 2/2017 | Mangette | B60W 50/0205 |
| 2017/0247038 A1* | 8/2017 | Savaresi | B60W 40/105 |
| 2018/0029603 A1* | 2/2018 | Kasaiezadeh Mahabadi | B60L 3/102 |
| 2019/0063913 A1* | 2/2019 | Leone | G01M 1/225 |
| 2019/0064027 A1* | 2/2019 | Leone | G01M 1/28 |
| 2019/0080529 A1* | 3/2019 | Saylor | G07C 5/0808 |
| 2019/0144032 A1* | 5/2019 | Cockerham | B62D 5/0484 |

FOREIGN PATENT DOCUMENTS

| | | |
|---|---|---|
| KR | 10-1992-0019591 | 11/1992 |
| KR | 10-2016-0065665 | 6/2016 |

* cited by examiner

Fig. 2

| Abnormal pattern | Wheel | | | |
|---|---|---|---|---|
| | FL | FR | RL | RR |
| one | ● | | | |
| | | ● | | |
| | | | ● | |
| | | | | ● |
| two | ● | ● | | |
| | ● | | ● | |
| | ● | | | ● |
| | | ● | ● | |
| | | ● | | ● |
| | | | ● | ● |
| three | ● | ● | ● | |
| | ● | ● | | ● |
| | ● | | ● | ● |
| | | ● | ● | ● |
| four | ● | ● | ● | ● |

Wheel speed
Pattern data

Wheel speed
Pattern data

Abnormal
pattern data

Fig. 6

| ABNORMAL PATTERN | CORRELATION DATA |
|---|---|
| 1 | 0 |
| 2 | 0.0022 |
| 3 | 0.01442 |
| 4 | 0.99989 |
| 5 | −0.5843 |
| 6 | −0.5702 |
| 7 | 0.56764 |
| 8 | −0.5676 |
| 9 | 0.57027 |
| 10 | 0.58430 |
| 11 | −0.9998 |
| 12 | −0.0144 |
| 13 | −0.0022 |
| 14 | 0 |
| 15 | 0 |

CONTROL SYSTEM OF DRIVE WHEEL OF VEHICLE AND CONTROL METHOD OF DRIVE WHEEL OF VEHICLE USING THE SAME

CROSS-REFERENCE TO RELATED APPLICATION

This application claims the benefit of priority to Korean Patent Application No. 10-2017-0166116, filed on Dec. 5, 2017 in the Korean Intellectual Property Office, the disclosure of which is incorporated herein by reference in its entirety.

BACKGROUND

1. Technical Field

The present disclosure relates generally to vehicular technologies and, more particularly, to a control system of a drive wheel of a vehicle and a control method of a drive wheel of a vehicle using the same.

2. Description of the Related Art

Recently, to enhance driving performance and driving safety, a rear wheel steering (RWS) system for steering a rear wheel of a vehicle has been implemented based upon a driving situation of the vehicle. The RWS system can control the vehicle so as to change steering angles of the front wheel and the rear wheel according to driving speed of the vehicle.

In one implementation, when a vehicle travels at low speed, the RWS system steers the rear wheel in an opposite direction of the front wheel. Thus, when the vehicle travels at low speed, the front and rear wheels are steered in opposite directions to reduce a turning radius, thereby enabling the vehicle to smoothly turn and travel even in a narrow place. On the other hand, when the vehicle travels at medium or high speed, the RWS system steers the rear wheel in the same direction as the front wheel. Thus, when the vehicle travels at medium or high speed, and vehicle pull prevention needs to be improved, the front and rear wheels are steered in the same direction, thereby stably improving vehicle pull prevention.

A conventional RWS system measures the speed of all four wheels of the vehicle, derives an average measured speed of the four wheels, and using this information, determines whether a rear wheel is steered in the same direction as a front wheel or in an opposite direction of the front wheel. However, if the wheel slips, locks, or the like, an error occurs when the rear wheel is controlled based on the average wheel speed.

The matters disclosed in this section are merely for enhancement of understanding of the general background of the disclosure and should not be taken as an acknowledgment or any form of suggestion that the matters form the related art already known to a person skilled in the art.

SUMMARY OF THE DISCLOSURE

Therefore, the present disclosure has been made in view of the above problems, and it is an object of the present disclosure to provide a control system of a drive wheel of a vehicle and a control method of a drive wheel of a vehicle using the same, for extracting wheel speed pattern data using wheel speed values measured from a wheel speed sensor, comparing the extracted wheel speed pattern data with data of a plurality of abnormal patterns, pre-stored in a data storage, to determine abnormal pattern data that is most similar to the wheel speed pattern data, and determining an abnormal wheel based on the determined abnormal pattern data.

In accordance with embodiments of the present disclosure, the above and other objects can be accomplished by the provision of a control system of a wheel of a vehicle including: a wheel speed sensor configured to measure a wheel speed of wheels of the vehicle; a data storage configured to store data relating to a plurality of abnormal patterns based on a slip state or a lock state of each wheel; and a controller configured to extract wheel speed pattern data using wheel speeds measured from the wheel speed sensor, to compare the extracted wheel speed pattern data with the stored data relating to the plurality of abnormal patterns, to determine an abnormal pattern among the plurality of abnormal patterns most similar to the extracted wheel speed pattern data according to the comparison, and to detect an abnormal wheel among the wheels of the vehicle based on the determined abnormal pattern.

The controller may extract a plurality of correlation data based on the comparison of the extracted wheel speed pattern data with the stored data relating to the plurality of abnormal patterns, determine the abnormal pattern based on the extracted plurality of correlation data, and detect the abnormal wheel based on the determined abnormal pattern and vehicle operation state information.

The determined abnormal pattern may have a largest correlation data value between the plurality of correlation data and the plurality of abnormal patterns.

The vehicle operation state information may indicate whether the vehicle is accelerating or braking.

The controller may calculate an average wheel speed of the wheels except for the detected abnormal wheel and control steering of a rear wheel of the vehicle based on the calculated average wheel speed of the wheels except for the detected abnormal wheel.

The controller may control an actuator positioned between the wheels of the vehicle and to control steering of a wheel among the wheels of the vehicle.

The controller may determine whether to steer a rear wheel of the vehicle in the same direction as a front wheel of the vehicle or in an opposite direction of the front wheel based on an average wheel speed and a predetermined speed stored in the data storage.

The controller may steer the rear wheel in the opposite direction off the front wheel when the average wheel speed is less than or equal to the predetermined speed.

The controller may steer the rear wheel in the same direction as the front wheel when the average wheel speed is greater than the predetermined speed.

The wheel speed pattern data may include front and rear wheel pattern data indicating a speed difference between corresponding front and rear wheels among the wheels of the vehicle, diagonal wheel pattern data indicating a speed difference between diagonally corresponding wheels, right and left drive wheel pattern data indicating a speed difference between corresponding right and left wheels, and region pattern data.

The wheels of the vehicle may include a left front wheel, a left rear wheel, a right front wheel, and a right rear wheel.

The front and rear wheel pattern data may be derived according to Expression 1 below:

$$\frac{(FL + FR) - (RL + RR)}{Vave},$$

where FL is a left front wheel speed, FR is a right front wheel speed, RL is a left rear wheel speed, RR is a right rear wheel speed, and Vave is a average wheel speed.

The diagonal wheel pattern data may be derived according to Expression 2 below:

$$\frac{(FL + RR) - (FR + RL)}{Vave},$$

where FL is a left front wheel speed, FR is a right front wheel speed, RL is a left rear wheel speed, RR is a right rear wheel speed, and Vave is a average wheel speed.

The right and left wheel pattern data may be derived according to Expression 3 below:

$$\frac{(FL + RL) - (FR + RR)}{Vave},$$

where FL is a left front wheel speed, FR is a right front wheel speed, RL is a left rear wheel speed, RR is a right rear wheel speed, and Vave is a average wheel speed.

The region pattern data may be derived according to Expression 4 below:

max(A,B,C)×sign(A,B,C), where A is the front and rear wheel pattern data, B is the diagonal wheel pattern data, and C is the right and left wheel pattern data.

The plurality of correlation data may be obtained by dividing a covariance result between the wheel speed pattern data and the abnormal pattern data with a product of standard deviation of the wheel speed pattern data and standard deviation of the abnormal pattern data.

The plurality of correlation data may be derived according to Expression 5 below:

$$P_{x,y} = \frac{\text{Cov}(x, y)}{\sigma_x \sigma_y},$$

where P is a correlation coefficient, x is the wheel speed pattern data, y is the abnormal pattern data, $\sigma_x$ is the standard deviation of wheel speed pattern data, and $\sigma_y$ is the standard deviation of abnormal pattern data, and the plurality of correlation data may be further derived according to Expression 6 below:

$$\text{Cov}(x, y) = \frac{\sum_{i=1}^{N}(x_i - u_x)(y_i - u_y)}{N - 1},$$

where x is the wheel speed pattern data, y is the abnormal pattern data, $u_x$ is average of wheel speed pattern data, and $u_y$ is average of abnormal pattern data.

Furthermore, in accordance with embodiments of the present disclosure, the above and other objects can be accomplished by the provision of a control method of a wheel of a vehicle including: measuring a wheel speed of wheels of the vehicle using a wheel speed sensor; extracting wheel speed pattern data using wheel speeds measured from the wheel speed sensor; comparing the extracted wheel speed pattern data with data relating to a plurality of abnormal patterns stored in a data storage; determining an abnormal pattern among the plurality of abnormal patterns most similar to the extracted wheel speed pattern data according to the comparison; and detecting an abnormal wheel among the wheels of the vehicle based on the determined abnormal pattern.

The method may further include: calculating a difference between measured wheel speeds measured from the wheel speed sensor; comparing the difference between the wheel speeds with a predetermined speed value; calculating an average wheel speed when the difference between the measured wheel speeds is less than the predetermined speed value; and extracting wheel speed pattern data when the difference between the measured wheel speeds is greater than the predetermined speed value.

The method may further include: extracting a plurality of correlation data based on the comparison of the extracted wheel speed pattern data with the stored data relating to the plurality of abnormal patterns; determining the abnormal pattern based on the extracted plurality of correlation data; detecting the abnormal wheel based on the determined abnormal pattern and vehicle operation state information; calculating an average wheel speed of the wheels except for the detected abnormal wheel; and controlling steering of a rear wheel of the vehicle based on the calculated average wheel speed of the wheels except for the detected abnormal wheel.

BRIEF DESCRIPTION OF THE DRAWINGS

The above and other objects, features and other advantages of the present disclosure will be more clearly understood from the following detailed description taken in conjunction with the accompanying drawings, in which:

FIG. 2 is a diagram showing a plurality of classified abnormal patterns in a control system of a drive wheel of a vehicle according to embodiments of the present disclosure;

FIG. 6 is a diagram showing correlation data of each abnormal pattern derived based on wheel speed pattern data and abnormal pattern data in a control system of a drive wheel of a vehicle according to embodiments of the present disclosure.

Figure 1:
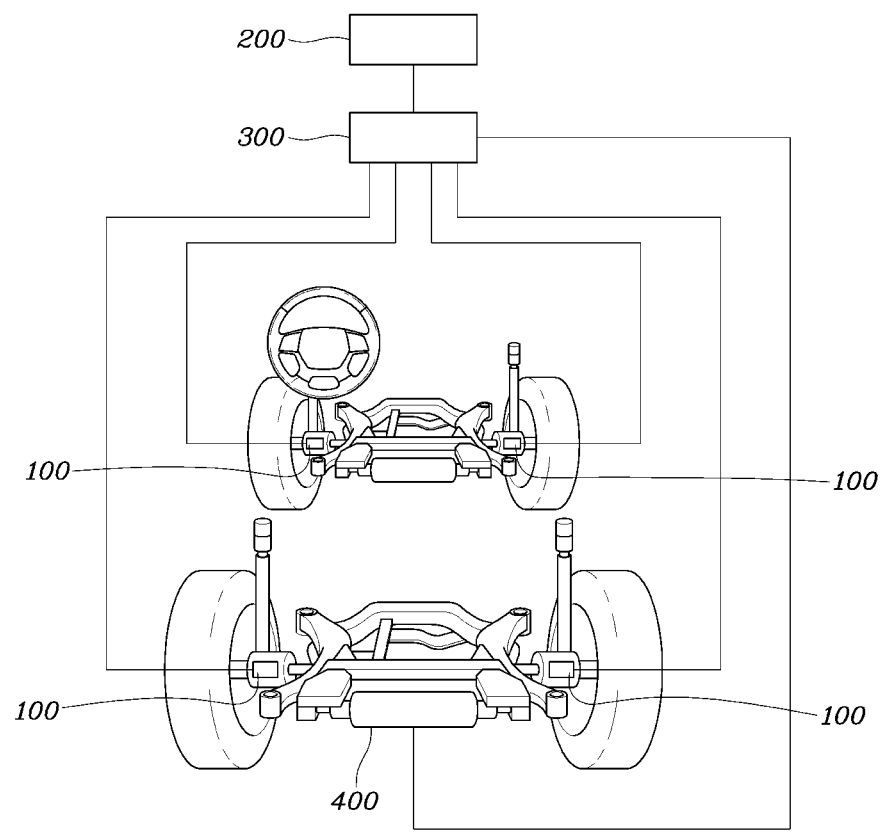
FIG. 1 is a schematic diagram showing an overall configuration of a control system of a drive wheel of a vehicle according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, or the like, as described herein. Moreover, it is understood that the below methods may be executed by an apparatus comprising the controller in conjunction with one or more other components, as would be appreciated by a person of ordinary skill in the art.

Hereinafter, a control system of a drive wheel of a vehicle and a control method thereof according to embodiments of the present disclosure will be described with reference to the accompanying drawings.

Figure 4:
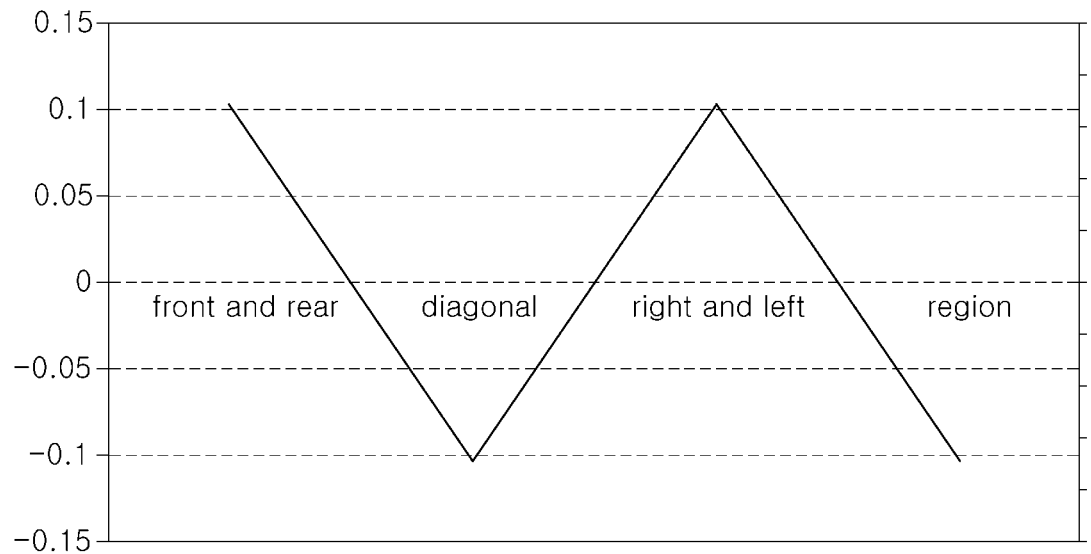
FIG. 4 is a graph based on extracted wheel speed pattern data in a control system of a drive wheel of a vehicle according to embodiments of the present disclosure.
Figure 5:
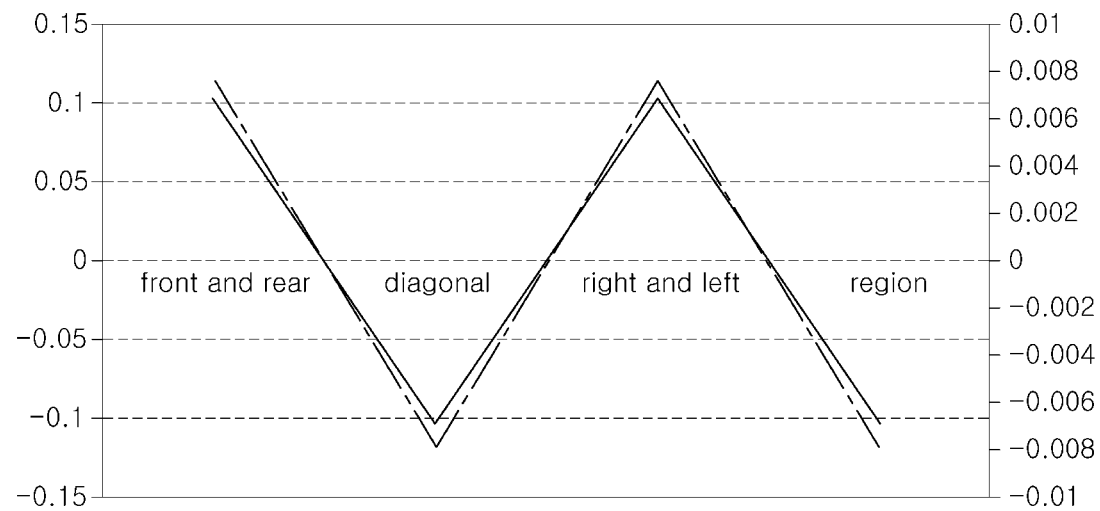
FIG. 5 is a graph showing a comparison between a plot based on extracted wheel speed pattern data and a plot based on data corresponding to an abnormal pattern in a control system of a drive wheel of a vehicle according to embodiments of the present disclosure.

FIG. 4 is a graph based on extracted wheel speed pattern data. FIG. 5 is a graph showing a comparison between a plot based on extracted wheel speed pattern data and a plot based on data corresponding to an abnormal pattern.

FIG. 1 is a schematic diagram showing an overall configuration of a control system of a drive wheel of a vehicle according to embodiments of the present disclosure. As shown in FIG. 1, the control system of a wheel ("wheel" and "drive wheel" may be used herein interchangeably) of a vehicle according to embodiments of the present disclosure may include wheel speed sensors 100 for measuring a speed of each wheel, a data storage 200 for storing data of a plurality of abnormal patterns according to a slip or lock state of each wheel, a controller 300 for detecting an abnormal wheel using a measured speed value of each wheel from the wheel speed sensors 100 and data of the plurality of abnormal patterns stored in the data storage 200, and an actuator 400 positioned between the wheels to control wheel steering.

The wheel speed sensors 100 may be installed at a left front wheel, a left rear wheel, a right front wheel, and a right rear wheel, respectively, and may measure speed of the respective wheels. Speed values of the wheels, measured from the wheel speed sensors 100, may be used to extract wheel speed pattern data by the controller 300 and the extracted pattern data may be used to detect an abnormal wheel.

Figure 3:
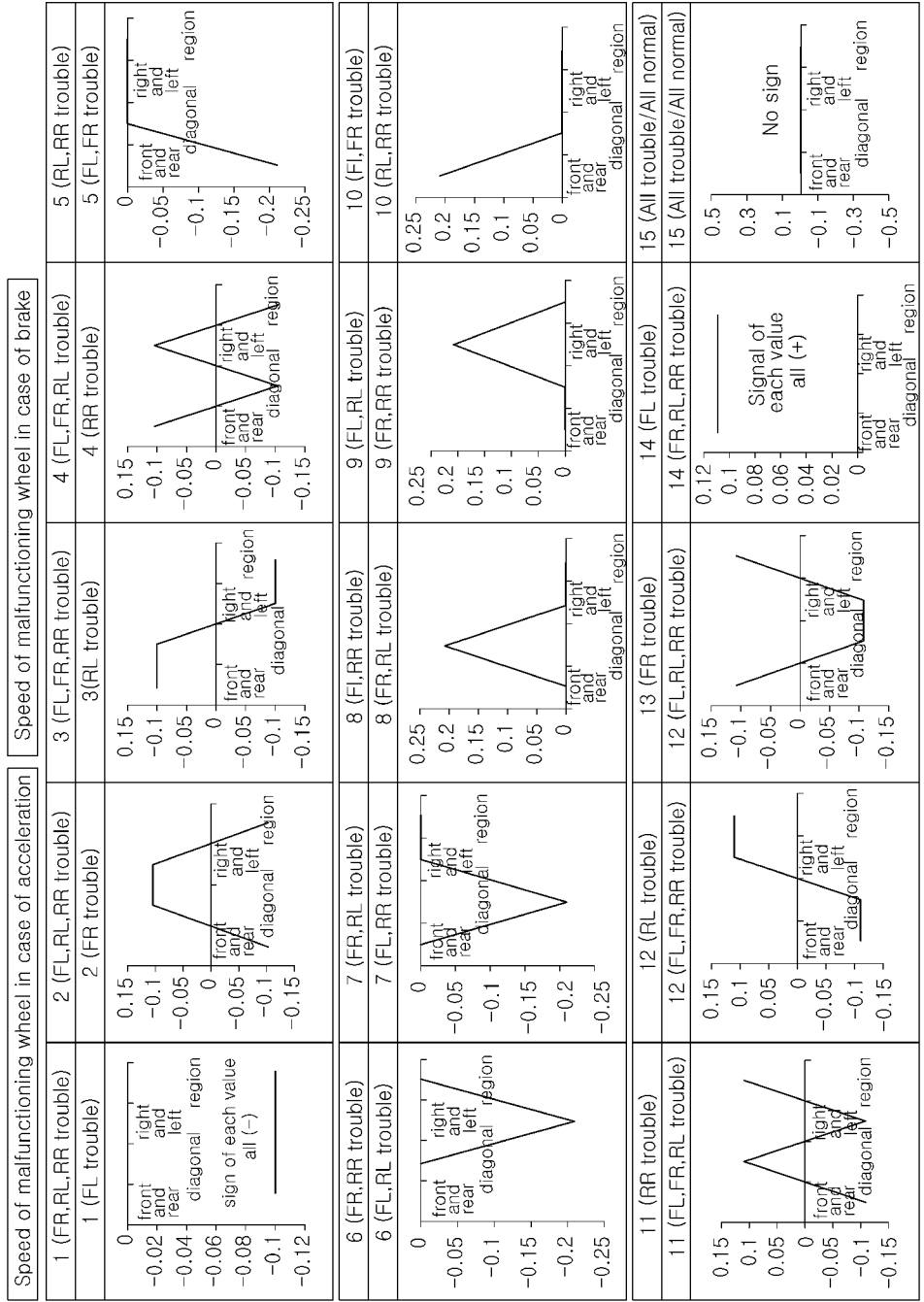
FIG. 3 is a graph showing a plurality of abnormal patterns based on data corresponding to the plurality of abnormal patterns according to embodiments of the present disclosure.

The data storage 200 may store data of a plurality of abnormal patterns according to a slip or lock state of each wheel. In detail, the data storage 200 may store information on a plurality of abnormal patterns according to a slip or lock state of a wheel as shown in FIG. 2 and may store plot information illustrated based on respective data according to the plurality of abnormal patterns as shown in FIG. 3.

FIG. 2 is a diagram showing a plurality of classified abnormal patterns. FIG. 3 is a graph showing a plurality of abnormal patterns based on data corresponding to the plurality of abnormal patterns. In more detail, according to the present disclosure, as shown in FIG. 2, abnormal patterns according to a slip or lock state of a wheel are classified into a total of 15 cases including a case in which one wheel is abnormal (four cases), a case in which two wheels are abnormal (six cases), a case in which three wheels are abnormal (four cases), and a case in which four wheels are abnormal (one case), graphs may be illustrated based on respective abnormal pattern data values corresponding to the 15 cases as shown in FIG. 3 and, in this case, the data storage 200 may store graph information illustrated based on the abnormal pattern information of the 15 cases and the abnormal pattern data of the 15 cases. As such, the data of the plurality of abnormal patterns, which is pre-stored in the data storage 200, may be used to detect an abnormal wheel by the controller 300.

The data storage 200 may store reference speed value information used to determine whether a rear wheel and a front wheel are steered in the same direction or in opposite directions based on an average wheel speed value by the controller 300.

The controller 300 may extract wheel speed pattern data using each wheel speed value measured by the wheel speed sensors 100. Here, the wheel speed pattern data may include front and rear wheel pattern data including speed difference information between corresponding front and rear wheels among the plurality of vehicle wheels, diagonally corresponding wheel pattern data including speed difference information between diagonally matched drive wheels, right and left wheel pattern data including speed difference information between corresponding right and left drive wheels, and region pattern data. In this case, the plurality of wheels may include a left front wheel, a left rear wheel, a right front wheel, and a right rear wheel.

In more detail, front and rear wheel pattern data may be derived from Expression 1 below, diagonal wheel pattern data may be derived from Expression 2 below, right and left wheel pattern data may be derived from Expression 3 below, and region pattern data may be derived from Expression 4 below.

$$\frac{(FL+FR)-(RL+RR)}{Vave}, \quad \text{Expression 1}$$

where FL is a left front wheel speed, FR is a right front wheel speed, RL is a left rear wheel speed, RR is a right rear wheel speed, and Vave is a average wheel speed.

$$\frac{(FL+RR)-(FR+RL)}{Vave}, \quad \text{Expression 2}$$

where FL is a left front wheel speed, FR is a right front wheel speed, RL is a left rear wheel speed, RR is a right rear wheel speed, and Vave is a average wheel speed.

$$\frac{(FL+RL)-(FR+RR)}{Vave}, \quad \text{Expression 3}$$

where FL is a left front wheel speed, FR is a right front wheel speed, RL is a left rear wheel speed, RR is a right rear wheel speed, and Vave is a average wheel speed.

$$\max(A,B,C) \times \text{sign}(A,B,C), \quad \text{Expression 4:}$$

where A is the front and rear wheel pattern data, B is the diagonal wheel pattern data, and C is the right and left wheel pattern data.

Upon extracting wheel speed pattern data using the aforementioned method, the controller 300 may compare the extracted wheel speed pattern data with data of a plurality of abnormal patterns, stored in the data storage 200, to determine abnormal pattern data that is most similar to the wheel speed pattern data. In some cases, when a graph illustrated based on the extracted wheel speed pattern data is as shown in FIG. 3, the controller 300 may compare the graph of FIG. 3 with each of the graphs based on data of the 15 abnormal patterns shown in FIG. 2 to determine an abnormal pattern that is most similar to FIG. 4.

In addition, the controller 300 may compare the extracted wheel speed pattern data with data of a plurality of abnormal patterns, pre-stored in the data storage 200, to extract a plurality of correlation data and determine an abnormal pattern based on the plurality of extracted correlation data. In this case, the controller 300 may determine abnormal pattern data from which a largest correlation data value is extracted among the plurality of extracted correlation data as an abnormal pattern. Here, the correlation data may be obtained by dividing a covariance result between wheel speed pattern data and abnormal pattern data with a product of standard deviation of the wheel speed pattern data and standard deviation of the abnormal pattern data and may be derived from Expressions 5 and 6.

$$P_{x,y} = \frac{Cov(x,y)}{\sigma_x \sigma_y}, \quad \text{Expression 5}$$

where P is a correlation coefficient, x is wheel speed pattern data, y is abnormal pattern data, $\sigma_x$ is a standard deviation of wheel speed pattern data, and $\sigma_y$ is a standard deviation of abnormal pattern data.

$$Cov(x,y) = \frac{\sum_{i=1}^{N}(x_i - u_x)(y_i - u_y)}{N-1}, \quad \text{Expression 6}$$

where x is wheel speed pattern data, y is abnormal pattern data, $u_x$ is average of wheel speed pattern data, and $u_y$ is an average of abnormal pattern data In more detail, the controller 300 may insert the four extracted wheel speed pattern data and the 15 abnormal pattern data pre-stored in the data storage 200 into Expressions 5 and 6 above to extract respective correlation data of the 15 abnormal patterns and determine abnormal pattern data from which a largest correlation data value is extracted among the 15 extracted correlation data as an abnormal pattern. That is, when the four extracted wheel speed pattern data and the 15 abnormal pattern data pre-stored in the data storage 200 are inserted into Expressions 5 and 6 above to extract correlation data shown in FIG. 6, the controller 300 may determine that an abnormal pattern is a fourth abnormal pattern.

Referring now to FIG. 3, when first abnormal pattern data, fourteenth abnormal pattern data, and fifteenth abnormal pattern data are inserted into Expression 6 above, a value of $y_i - u_y$ may be 0 and Cov(x,y) may be 0 and, accordingly, a numerator of Expression 5 above, Cov(x,y) may be 0 and, thus, correlation data may be 0. In this case, with regard to determination of an abnormal pattern, when the sum of the four extracted wheel speed pattern data is negative, a first abnormal pattern may be determined as an abnormal pattern, when the sum is positive, a fourteenth abnormal pattern may be determined as an abnormal pattern, and when the sum is 0, a fifteenth abnormal pattern may be determined as an abnormal pattern.

In addition, the controller 300 may determine an abnormal pattern according to the aforementioned method, and then detect an abnormal wheel based on the determined abnormal pattern information and vehicle operation state information. Here, the vehicle operation state information may include a state in which a vehicle is accelerated or brakes. Referring again to FIG. 3, when a second abnormal pattern is determined as an abnormal pattern using the aforementioned method, an abnormal wheel may be a right front wheel, a left front wheel, a right rear wheel, and a left rear wheel depending on a vehicle operation state. That is, when a vehicle is accelerated, an abnormal wheel may be a left front wheel, a right rear wheel, and a left rear wheel and, when the vehicle brakes, an abnormal wheel may be a right front wheel.

As such, the controller 300 may extract wheel speed pattern data using each wheel speed value measured from a wheel speed sensor, extract a plurality of correlation data based on the extracted wheel speed pattern data and a plurality of abnormal pattern data pre-stored in a data storage, determine an abnormal pattern based on the extracted correlation data, and detect an abnormal wheel based on the determined abnormal pattern and the vehicle operation state information.

Furthermore, the controller 300 may extract an average wheel speed value except for speed of the detected abnormal wheel and control steering of a rear wheel based on the extracted average wheel speed vale. In this case, the controller 300 may control the actuator 400 positioned between wheels to control steering of the rear wheel.

In more detail, a controller may compare the extracted average wheel speed value with a reference speed value that is predetermined in the data storage 200 and, when the average wheel speed value is equal to or less than the reference speed value, the controller may steer a rear wheel in an opposite direction to a front wheel. On the other hand, when the extracted average wheel speed value exceeds the reference speed value, the controller 300 may steer the rear wheel in the same direction as the front wheel.

Figure 7:
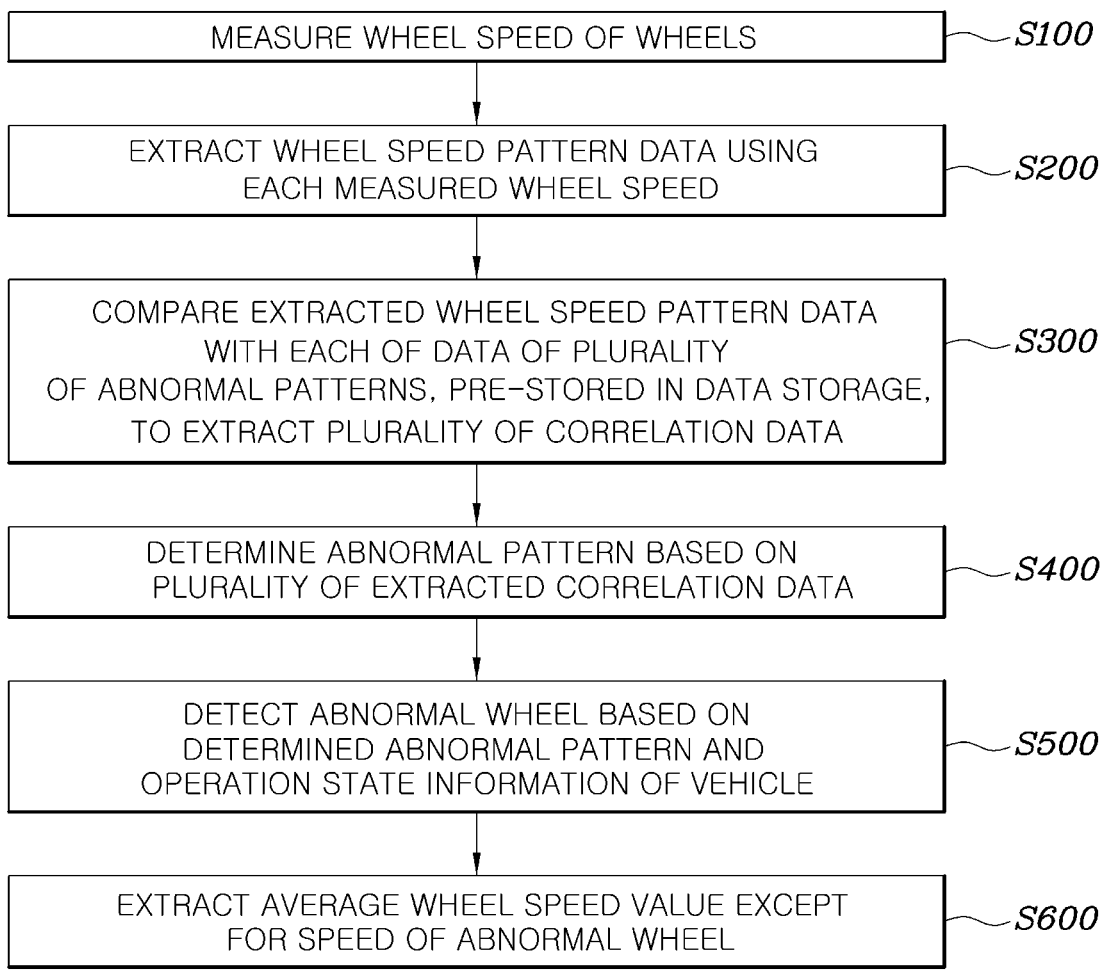
FIG. 7 is a flowchart showing a control method of a drive wheel of a vehicle according to embodiments of the present disclosure.

FIG. 7 is a flowchart showing a control method of a drive wheel of a vehicle according to embodiments of the present disclosure. As shown in FIG. 7, the control method of a drive wheel of a vehicle may include measuring wheel speed of wheels, extracting wheel speed pattern data using each measured wheel speed, comparing the extracted wheel speed pattern data with each of data of a plurality of abnormal patterns, pre-stored in a data storage, to extract a plurality of correlation data, determining an abnormal pattern based on the plurality of extracted correlation data, detecting an abnormal wheel based on the determined abnormal pattern and operation state information of the vehicle, and extracting an average wheel speed value except for speed of the abnormal wheel.

The method may further include, prior to the extracting of the wheel speed pattern data using each measured wheel speed, extracting a difference between measured wheel speed values measured from a wheel speed sensor, comparing the difference between the wheel speed values with a predetermined value, extracting an average wheel speed value when the difference between the wheel speed values is less than the predetermined value, as a comparison result, and extracting wheel speed pattern data when the difference between the wheel speed values is greater than the predetermined value, as a comparison result.

The method may further include, after the extracting of the average wheel speed value except for speed of the abnormal wheel, controlling steering of a rear wheel based on the extracted average wheel speed value.

As described above, according to embodiments of the present disclosure, wheel speed pattern data may be extracted using wheel speed values measured from a wheel speed sensor, the extracted wheel speed pattern data may be compared with data of a plurality of abnormal patterns, pre-stored in a data storage, to determine abnormal pattern data that is most similar to the wheel speed pattern data, and an abnormal wheel may be determined based on the determined abnormal pattern data.

In addition, an average wheel speed value except for speed of the detected abnormal wheel may be extracted and a rear wheel may be steered based on the extracted average wheel speed value and, accordingly, even if a wheel slip state, a wheel lock state, or the like occurs, steering of the rear wheel may be appropriately controlled according to actual vehicle speed.

While the contents of the present disclosure have been described in connection with what is presently considered to be exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A control system of a wheel of a vehicle, comprising:
   a wheel speed sensor configured to measure a wheel speed of wheels of the vehicle;
   a data storage configured to store data relating to a plurality of abnormal patterns based on a slip state or a lock state of each wheel; and
   a controller configured to extract wheel speed pattern data using wheel speeds measured from the wheel speed sensor, to compare the extracted wheel speed pattern data with the stored data relating to the plurality of abnormal patterns, to determine an abnormal pattern among the plurality of abnormal patterns most similar to the extracted wheel speed pattern data according to the comparison, and to detect an abnormal wheel among the wheels of the vehicle based on the determined abnormal pattern,
   wherein the controller is further configured to extract a plurality of correlation data based on the comparison of the extracted wheel speed pattern data with the stored data relating to the plurality of abnormal patterns, to determine the abnormal pattern based on the extracted plurality of correlation data, and to detect the abnormal wheel based on the determined abnormal pattern and vehicle operation state information, and
   wherein the plurality of correlation data is obtained by dividing a covariance result between the wheel speed pattern data and the abnormal pattern data with a product of standard deviation of the wheel speed pattern data and standard deviation of the abnormal pattern data.

2. The control system according to claim 1, wherein the determined abnormal pattern has a largest correlation data value among the plurality of correlation data.

3. The control system according to claim 1, wherein the vehicle operation state information indicates whether the vehicle is accelerating or braking.

4. The control system according to claim 1, wherein the controller is further configured to calculate an average wheel speed of the wheels except for the detected abnormal wheel and to control steering of a rear wheel of the vehicle based on the calculated average wheel speed of the wheels except for the detected abnormal wheel.

5. The control system according to claim 1, wherein the controller is further configured to control an actuator positioned between the wheels of the vehicle and to control steering of a wheel among the wheels of the vehicle.

6. The control system according to claim 1, wherein the controller is further configured to determine whether to steer a rear wheel of the vehicle in the same direction as a front wheel of the vehicle or in an opposite direction of the front wheel based on an average wheel speed and a predetermined speed stored in the data storage.

7. The control system according to claim 6, wherein the controller is further configured to steer the rear wheel in the opposite direction of the front wheel when the average wheel speed is less than or equal to the predetermined speed.

8. The control system according to claim 6, wherein the controller is further configured to steer the rear wheel in the same direction as the front wheel when the average wheel speed is greater than the predetermined speed.

9. The control system according to claim 1, wherein the wheel speed pattern data comprises front and rear wheel pattern data indicating a speed difference between corresponding front and rear wheels among the wheels of the vehicle, diagonal wheel pattern data indicating a speed difference between diagonally corresponding wheels, right and left drive wheel pattern data indicating a speed difference between corresponding right and left wheels, and region pattern data.

10. The control system according to claim 9, wherein the wheels of the vehicle comprise a left front wheel, a left rear wheel, a right front wheel, and a right rear wheel.

11. The control system according to claim 9, wherein the front and rear wheel pattern data is derived according to Expression 1 below:

$$\frac{(FL+FR)-(RL+RR)}{Vave},$$

wherein FL is a left front wheel speed, FR is a right front wheel speed, RL is a left rear wheel speed, RR is a right rear wheel speed, and Vave is an average wheel speed.

12. The control system according to claim 9, wherein the diagonal wheel pattern data is derived according to Expression 2 below:

$$\frac{(FL+RR)-(FR+RL)}{Vave},$$

wherein FL is a left front wheel speed, FR is a right front wheel speed, RL is a left rear wheel speed, RR is a right rear wheel speed, and Vave is an average wheel speed.

13. The control system according to claim 9, wherein the right and left wheel pattern data is derived according to Expression 3 below:

$$\frac{(FL+RL)-(FR+RR)}{Vave},$$

wherein FL is a left front wheel speed, FR is a right front wheel speed, RL is a left rear wheel speed, RR is a right rear wheel speed, and Vave is an average wheel speed.

14. The control system according to claim 9, wherein the region pattern data is derived according to Expression 4 below:

max(A,B,C)×sign(A,B,C), wherein A is the front and rear wheel pattern data, B is the diagonal wheel pattern data, and C is the right and left wheel pattern data.

15. The control system according to claim 1, wherein:
the plurality of correlation data is derived according to Expression 5 below:

$$P_{x,y} = \frac{Cov(x, y)}{\sigma_x \sigma_y},$$

wherein P is a correlation coefficient, x is the wheel speed pattern data, y is the abnormal pattern data, $\sigma_x$ is the standard deviation of wheel speed pattern data, and $\sigma_y$ is the standard deviation of abnormal pattern data, and the plurality of correlation data is further derived according to Expression 6 below:

$$Cov(x, y) = \frac{\sum_{i=1}^{N}(x_i - u_x)(y_i - u_y)}{N-1},$$

wherein x is the wheel speed pattern data, y is the abnormal pattern data, $u_x$ is average of wheel speed pattern data, and $u_y$ is average of abnormal pattern data.

16. A control method of a wheel of a vehicle, the method comprising:
measuring a wheel speed of wheels of the vehicle using a wheel speed sensor;
extracting wheel speed pattern data using wheel speeds measured from the wheel speed sensor;
comparing the extracted wheel speed pattern data with data relating to a plurality of abnormal patterns stored in a data storage;
extracting a plurality of correlation data based on the comparison of the extracted wheel speed pattern data with the stored data relating to the plurality of abnormal patterns;
determining the abnormal pattern based on the extracted plurality of correlation data; and
detecting the abnormal wheel based on the determined abnormal pattern and vehicle operation state information,
wherein the plurality of correlation data is obtained by dividing a covariance result between the wheel speed pattern data and the abnormal pattern data with a product of standard deviation of the wheel speed pattern data and standard deviation of the abnormal pattern data.

17. The method according to claim 16, further comprising:
calculating a difference between measured wheel speeds measured from the wheel speed sensor;
comparing the difference between the wheel speeds with a predetermined speed value;
calculating an average wheel speed when the difference between the measured wheel speeds is less than the predetermined speed value; and
extracting wheel speed pattern data when the difference between the measured wheel speeds is greater than the predetermined speed value.

18. The method according to claim 16, further comprising,
calculating an average wheel speed of the wheels except for the detected abnormal wheel; and
controlling steering of a rear wheel of the vehicle based on the calculated average wheel speed of the wheels except for the detected abnormal wheel.

* * * * *